United States Patent [19]
Clark et al.

[11] 3,879,431
[45] Apr. 22, 1975

[54] PURIFICATION OF STEROLS BY DISTILLATION

[75] Inventors: James P. Clark, Forest Lake; Jimmy A. Demars; Gerald G. Wilson, both of Minneapolis, all of Minn.

[73] Assignee: General Mills Chemicals, Inc., Minneapolis, Minn.

[22] Filed: Oct. 5, 1973

[21] Appl. No.: 404,089

[52] U.S. Cl. ............................................. 260/397.25
[51] Int. Cl. .................... C07c 167/38; C07c 167/42
[58] Field of Search ................................ 260/397.25

[56] References Cited
UNITED STATES PATENTS
2,835,682  5/1958  Steiner et al. ................... 260/397.25
2,866,739  12/1958  Ciesielski et al. ............... 260/397.25

Primary Examiner—Elbert L. Roberts
Attorney, Agent, or Firm—Anthony A. Juettner; Patrick J. Span; Norman P. Friederichs

[57] ABSTRACT

Disclosed is a method for separating campesterol and sitosterol from a mixture including same. A mixture of sterols is fractionated at particular temperatures and pressures to produce fractions that are enriched in campesterol and other fractions that are enriched in sitosterol.

13 Claims, No Drawings

PURIFICATION OF STEROLS BY DISTILLATION

The present invention relates to a method for separating mixtures containing free sterols and more particularly separating mixtures containing sitosterol and campesterol.

In the past it has been believed difficult, if not impossible, to commercially separate the free forms of sitosterol and campesterol. This is due to the fact that such materials have nearly identical properties, both physical and chemical. The chemical structures of sitosterol and campesterol are virtually identical except that sitosterol has an additional methylene group on the side chain. The structural formulii are as follows:

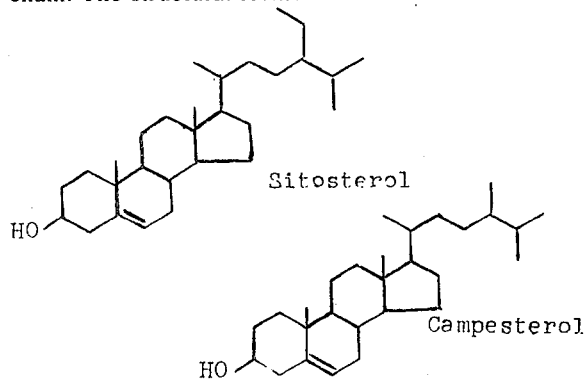

Sitosterol and campesterol are soluble in the same solvents such as hot ethylene dichloride and crystallize out of cold ethylene dichloride in substantially the same ratios as they were added to the hot ethylene dichloride. Thus, recrystallization has not been found suitable for separating sitosterol from campesterol on a commercial scale. In view of the nearly identical structures of sitosterol and campesterol and in view of the nearly identical molecular weights, one would expect the vaporizing temperatures to be substantially the same. The molecular weight of campesterol is about three percent less than sitosterol. The melting point of sitosterol is within about five degrees centigrade of the melting point of campesterol. In view of this, it has not appeared feasible in the past to commercially separate sitosterol and campesterol. The present invention provides a method for separating a mixture containing sitosterol and campesterol into fractions enriched in sitosterol and fractions enriched in campesterol.

The starting material in the present invention may be any mixture including sitosterol and campesterol. The various unsaturated vegetable oils, such as soybean oil, cottonseed oil, safflower oil, peanut oil, rice oil and the like, contain both sitosterol and campesterol together with various other materials such as other sterols (e.g., stigmasterol) and the higher aliphatic alcohols. Such oils contain sterols in an amount of less than 0.5% by weight (i.e., about 0.2%). Tall oil also is a significant source of the sitosterol and campesterol mixture. The sterol mixture used in carrying out the present invention preferably is a concentrated mixture of free sterols including sitosterol and campesterol. The sterol mixture may be concentrated by any suitable method such as (1) saponification, extraction and crystallization; (2) distillation; or (3) high pressure propane extraction. The concentrated sterol mixture may be a by-product stream from various commercial processes such as soap stock production or oil deodorization processes. In those instances in which the sitosterol and campesterol are in the form of sterol esters, the mixture is saponified to form the free sitosterol and campesterol. Saponification may be carried out by adding suitable alkali such as an alcoholic solution of potassium hydroxide. The sterols, higher alcohols and other unsaponifiable materials may be removed from the saponified materials such as the saponified fatty acids and saponified rosin acids. The unsaponifiable materials may be separated from the saponified materials such as by solvent extraction and crystallization. Typically the solvent may be ethylene dichloride. In other words, the free sterols and certain other materials present may be dissolved in hot ethylene dichloride and then the free sterols may be crystallized out in a more concentrated form by cooling the solution. Much of the other material present remains dissolved in the cold ethylene dichloride. The various impurities remaining with the concentrated sterols and which are more volatile than the recovered sterols may be removed by distillation. Such impurities may include alcohols, ethylene dichloride and water. These impurities may be removed by distillation at a pressure of between 0.1 and 3.5 mm Hg. and a temperature of about 170°–230°C. The residue may contain inorganic salts (e.g., sodium chloride) and organic materials (e.g., tars). As used herein the term "pressure" will mean absolute pressure. The residue is then fractionated to provide a fraction or fractions enriched in campesterol leaving a fraction enriched in sitosterol. The sitosterol may then be distilled to remove same from residue impurities. The fractions may be removed at a vapor pressure of between 0.05 and 3.5 mm. of Hg. and a vapor temperature of between 225°C. and 270°C. The vapor pressure - temperature relationship during the fractionation may be represented by the formula $T = 257 (X^{+ \, 0.0355})$ wherein T is the temperature in degrees centigrade and X is the pressure expressed in mm of Hg. The fractionation is carried out in the absence of added distillation aids such as oils or carriers such as steam or liquified hydrocarbons (e.g. propane or methane). Such distillation aids and carriers may create a variety of problems. For example, such materials may form undesirable by-products such as through transesterification of the sterols. Such by-products, of course, result in product loss and decrease in purity of the final product. The distillation aid and/or carriers by their mere presence decrease the purity and may necessitate subsequent removal which adds to production costs. Fractionation according to the present invention has been carried out in which the residence time of the sterols in the still has been up to 15 minutes and in some instances even longer residence times have been utilized.

EXAMPLE I

A 100.5 gram sample of material[1] containing soy sterols was fractionated according to the present invention. The material contained 90.3% free sterols, by weight. The composition of the material was as follows: 21.4% stigmasterol, 23.0% campesterol and 45.8% sitosterol. The apparatus used was standard high vacuum, batch-type laboratory distillation apparatus. The pressure in the system was about 0.08 mm. of Hg. absolute. The temperature in the distillation pot was about 255°C. The temperature in the lower head of the apparatus was about 232°C. The temperature in the upper head was about 226°C. Three fractions were taken during the distillation. The results are shown in Table I.

[1] The material was a sterol mixture sold by General Mills Chemicals, Inc. under the trademark General 100.

TABLE I

| Fraction No. | Wt. of Fractions in gms. | % ampesterol | % Stigma- sterol | % Sito- sterol | % Total Sterols | Sitosterol/ Campersterol Ratio |
| --- | --- | --- | --- | --- | --- | --- |
| I-A | 11.4 | 24.5 | 19.5 | 34.1 | 78.1 | 1.39 |
| I-B | 38.9 | 25.7 | 21.7 | 42.3 | 89.7 | 1.64 |
| I-C | 42.0 | 19.7 | 20.1 | 53.6 | 93.4 | 2.72 |
| I-Residue | 5.9 | 7.5 | 7.0 | 20.6 | 35.1 | 2.75 |
| Cold Trap | 2.3 | Material discarded | | | | |

EXAMPLE II

A 100 gram sample of material[2] derived from soy sterols was fractionated according to the present invention. The material contained 87.3% free sterols, by weight. The composition of the material was as follows: 4.4% stigmasterol, 54.9% sitosterol and 28.0% campesterol. The sitosterol/campesterol ratio of the material was 1.95. The apparatus was as described in Example I. The pressure in the system was about 0.35 mm of Hg. The temperature of the material in the distillation pot was about 258°C. The temperature in the lower head was about 230°C. to 235°C. The temperature of the upper head ran from 225° to 235°C. Three fractions were taken during the distillation. The results are shown in TABLE II.

(2) The material was a sterol mixture sold by General Mills Chemicals, Inc. under the trademark General 100.

TABLE II

| Fraction No. | Wt. of Fraction in grams | % ampe- sterol | % Stigma- stereol | % Sito- sterol | % Total Sterol | Sitosterol/ campesterol ratio |
| --- | --- | --- | --- | --- | --- | --- |
| II-A | 10.2 | 29.4 | 3.4 | 39.4 | 39.4 | 1.34 |
| II-B | 40.9 | 30.1 | 3.7 | 48.2 | 82.0 | 1.60 |
| II-C | 40.4 | 20.6 | 2.8 | 52.6 | 75.4 | 2.55 |
| II-Residue | 7.3 | 2.9 | 0.5 | 8.9 | 12.3 | 3.07 |
| Cold Trap | 0.7 | | | | | |

EXAMPLE III

A cottonseed sterol mixture containing about 54.9% free sterol was processed according to the present invention using the apparatus of Example I. The feed sample was 100 grams and had a sitosterol to campesterol ratio of 6.91. The pressure in the system was 0.3 mm. of Hg. A first distillation fraction, which boiled at a temperature of from 130° to 261°C., was taken in an amount of 20.8 grams. The sitosterol to campesterol ratio was 6.4 thus showing enrichment in campesterol. A second distillation fraction was taken at a temperature of from 261° to 266°C. This fraction weighed 39.1 grams. The sitosterol to campesterol ratio was 7.84. The second fraction contained 69.1% free sterol thus showing substantial upgrading of the free sterol content. Also, the sitosterol level was significantly increased. A third distillation fraction was taken at a temperature of from 266° to 278°C. This fraction weighed 8.6 grams and had a sitosterol to campesterol ratio of 15.6. The residue had a sitosterol to campesterol ratio of over 20.

EXAMPLE IV

A tall oil sterol mixture containing about 81.4% free sterol was processed according to the present invention. The sterol mixture included 73.3% sitosterol, 1.0% stigmasterol and 7.1% campesterol. The mixture was heated to 140°C. and fed to a high vacuum fractionation unit (an Eckey Still) having a fractionating capacity of about 5 theoretical plates. A distillate fraction of about 13.5% was taken at a vapor temperature of 228°C. and a pressure of 0.5 mm. of Hg. as measured in the condenser area. The temperature of the residue stream leaving the still was 265°C. The distillate fraction contained 41.7% sterols including 34.6% sitosterol, 1.5% stigmasterol and 5.6% campesterol. The residue contained 86% free sterols thus showing a significant upgrading of the sterol content. The residue included 77.2% sitosterol, 1.8% stigmasterol and 7.0% campesterol. The distillation thus provided a significant upgrading of the sterol content and an adjustment of the sitosterol/campesterol ratio.

EXAMPLE V

A tall oil sterol mixture was processed as described in Example IV. The residue contained 77.14% free sterols including 69.24% sitosterol, 1.74% stigmasterol and 6.1% campesterol. The residue was fed to a wiped film still. The temperature of the stream coming off the bottom of the still wall was 255°C. The pressure in the still was 0.55 mm. of Hg. A distillate fraction containing 82% of the mixture was obtained. The distillate contained 90.3% free sterols including 80.8% sitosterol, 2.1% stigmasterol, and 7.4% campesterol. The residue stream contained 17.1% free sterols including 16.6% sitosterol, less than 0.1% stigmasterol, and about 0.5% campesterol. The distillation provided a product having a very high sterol content and significant adjustment in the sitosterol/campesterol ratio.

EXAMPLE VI

A sterol mixture[3] containing about 81.9% free sterols was processed according to the present invention. The mixture included 52.1% sitosterol, 3.0% stigmasterol and 26.8% campesterol. The mixture was fed to an Eckey Still operated at a pressure of 1.3 mm. of Hg. The vapor temperature was 220°C. and the reboiler temperature was 280°C. The distillate fraction contained 11.3% of the sterol mixture. The distillate fraction contained 64.2% free sterols including 32.5% sitosterol, 2.6% stigmasterol and 29.1% campesterol. The fraction thus had a significant decrease in the sitosterol to campesterol ratio. The residue contained 84.2% free sterols including 54.6% sitosterol, 3.1% stigmasterol and 26.5% campesterol (3) A product marketed by General Mills Chemicals, Inc. under the trademark General 105.

EXAMPLE VII

A sterol mixture of the same general type used in Example VI was processed according to the present invention. The sterol mixture was first treated as described in Example VI. The residue contained 83.5% free sterols including 53.7% sitosterol, 3.6% stigmasterol and 26.2% campesterol. The residue was fed to a wiped film still operated at a pressure of 0.8 mm of Hg. The temperature of the residue stream leaving the bottom of the still wall was 256°C. The distillate contained 81% of the feed material. The distillate had a sterol content of 91.3% and included 58.0% sitosterol, 4.2% stigmasterol and 29.1% campesterol. The residue stream contained 67.4% sterols including 46.0% sitosterol, 2.6% stigmasterol and 18.8% campesterol.

The process of the present invention may be carried out in a batch-type operation as illustrated by Examples I–III or in a continuous operation as illustrated by Examples IV–VII. In one preferred embodiment of the invention the free sterol mixture is first solvent extracted with methanol, ethanol, hexane, pentane, ethylene dichloride or a mixture of ethylene dichloride and hexane to remove impurities. The solvent extracted sterols may then be fractionated in an Eckey type still to remove the low molecular weight materials which vaporize at a temperature below that at which major amounts of the sterols are vaporized such as up to about 15% of the mixture. As used herein, the term "percent" and the like means percent by weight unless otherwise stated. The residue may then be fractionated in a wiped film type evaporator to separate fractions enriched in campesterol from fractions enriched in sitosterol such as up to 90% of the residue. These fractions will have a desirable lessening of the color in the sterols and will be cream colored or nearly white. The residue may have a greatly increased sitosterol to campesterol ratio although it may have a low level of total sterols. The sterols may be separated from the remaining materials in the residue (i.e., inorganic salts and the like) by solvent extraction such as the previously mentioned solvents, typically ethylene dichloride, methanol or a mixture of ethylene dichloride and hexane.

The sterol mixture used in the present invention may be any mixture containing free campesterol and sitosterol. The sterol mixture preferably has at least 50% free sterols (i.e., campesterol and sitosterol), typically more than 70% of said free sterols. However, mixtures having lower sterol levels may be processed according to the present invention. In any event, said sterols being fractionated are present in amounts of at least 10%.

The sterols which have been processed according to the present invention may be used for any of various end uses. For example, the fractions high in sitosterol may be used for known medicinal purposes. For example, a water emulsion may be ingested to prevent or reduce reabsorption of cholesterol in the small intestine. It is desirable to have low campesterol levels in such medicinal uses since the campesterol is believed to decrease the effectiveness of the sitosterol. The fractions high in sitosterol may alternatively be used in artificial foods for silk worms which require the sitosterol for proper development. The campesterol fractions and the sitosterol fractions may be used alternatively for various other purposes.

The embodiment of the invention in which an exclusive property or priviledge is claimed are defined as follows:

1. A process for separating sterol mixture including campesterol and sitosterol into fractions rich in campesterol and residue rich in sitosterol, said mixture being obtained from unsaturated vegetable oil, said sitosterol and campesterol being in the form of free sterols, said free sterols being present in an amount of at least 10% by weight, said method comprising distilling said mixture at a vapor temperature of between 225°C. and 270°C. and an absolute pressure of between 0.05 and 3.5 mm of Hg. to provide a distillate fraction rich in campesterol and a residue fraction rich in sitosterol.

2. The process of claim 1 wherein the temperature and pressure relationship is defined by the formula $T = 257(X^{+0.0355})$ wherein T is the temperature expressed in degrees centigrade and X is the pressure expressed in millimeters of mercury.

3. A process for preparing a purified sterol mixture including sitosterol and campesterol said process comprising: feeding a sterol material including free sterols to a vacuum distillation unit said sterol material being obtained from unsaturated vegetable oil, at least 10% of said free sterols consisting of a mixture of sitosterol and campesterol, distilling said material at a vapor temperature of from 170° to 230°C. and at an absolute pressure of from 0.1 to 3.5 mm of Hg. to remove an impure portion of up to 15% of said material, feeding the residue to a distillation unit and distilling said residue to remove up to about 90% of said residue, said second distillation being at a vapor temperature of from 225° to 270°C. and an absolute pressure of from 0.05 to 3.5 mm. of Hg.

4. The process of claim 3 wherein the residue of said second distillation is solvent extracted to obtain a sterol product rich in sitosterol, said solvent extraction comprising dissolving said sitosterol in a solvent, said solvent being at least one member selected from the group consisting of ethylene dichloride, methanol, ethanol, pentane, and hexane and then removing said sitosterol from said solvent.

5. The process of claim 3 wherein said sterol mixture is obtained from soybean oil and wherein the nonsterol, unsaponifiable materials have been separated from said sterol material prior to said first distillation.

6. The process of claim 4 wherein said solvent extraction is carried out using as a solvent a member of the group consisting of ethylene dichloride and a mixture of ethylene dichloride and hexane.

7. The process of claim 4 wherein said solvent extraction is carried out using as a solvent a member of the group consisting of methanol, ethanol, hexane and pentane.

8. The process of claim 3 wherein said sterol mixture is obtained from tall oil.

9. The process of claim 3 wherein said sterol mixture is obtained from cottonseed oil.

10. The process of claim 3 wherein said sterol mixture is obtained from rice oil.

11. The process of claim 3 wherein said sterol mixture is obtained from safflower oil.

12. The process of claim 3 wherein said sterol mixture is obtained from peanut oil.

13. A process for separating a mixture of free campesterol and free sitosterol in a fraction rich in campesterol and a residue rich in sitosterol, said method comprising distilling said mixture at a vapor temperature of between 225°C. and 270°C. and an absolute pressure of between 0.05 and 3.5 mm of Hg. to provide a distillate fraction rich in campesterol and a residue fraction rich in sitosterol.

* * * * *